J. W. Barbour
Rag Engine.
Nº 98,692. Patented Jan. 11, 1870.
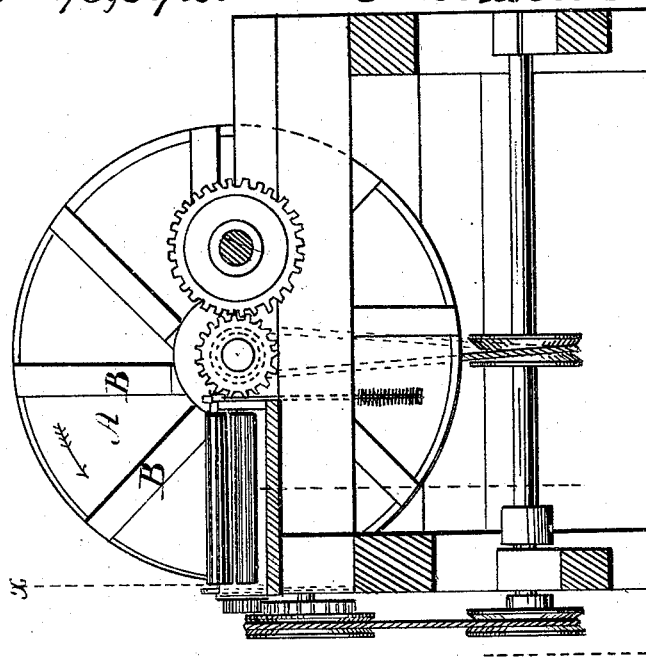
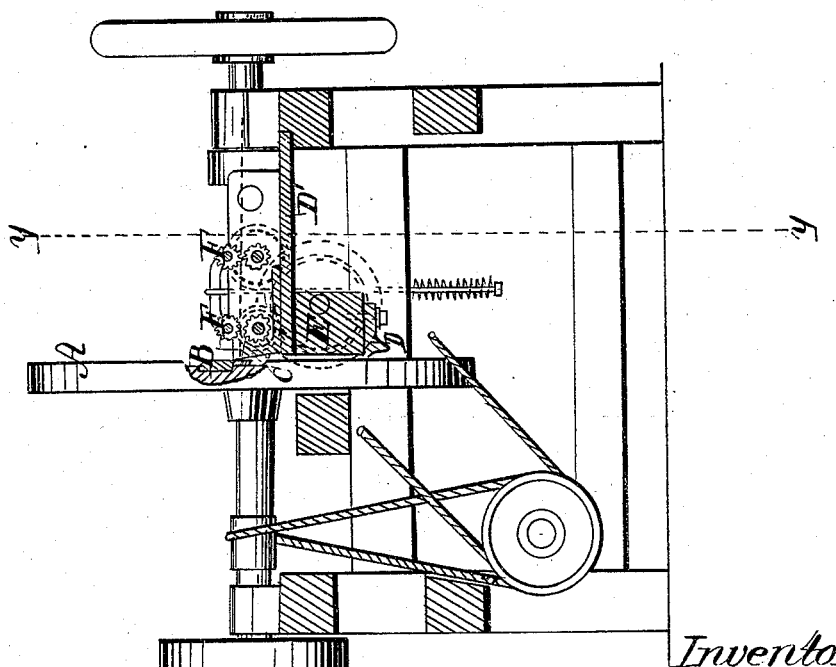
Witnesses,
Chas. Nida
Geo. W. Elfabee
Inventor;
J. W. Barbour
per Munn & Co
Attys.

United States Patent Office.

J. W. BARBOUR, OF WINOOSKI FALLS, VERMONT.

Letters Patent No. 98,692, dated January 11, 1870; antedated December 29, 1869.

IMPROVED RAG-CUTTER.

The Schedule referred to in these Letters Patent and making part of the same.

*To all whom it may concern:*

Be it known that I, J. W. BARBOUR, of Winooski Falls, in the county of Chittenden, and State of Vermont, have invented a new and improved Rag-Cutter; and I do hereby declare that the following is a full, clear, and exact description thereof, which will enable others skilled in the art to make and use the same, reference being had to the accompanying drawing, forming part of this specification.

This invention relates to improvements in machines for cutting rags and other substances for paper-stock, the object of which is to provide certain improvements in the arrangement of the cutters, as hereinafter more fully specified.

Figure 1 represents a transverse sectional elevation, taken on the line $x\ x$ of fig. 2.

Figure 2 represents a longitudinal sectional elevation, taken on the line $y\ y$ of fig. 1.

Similar letters of reference indicate corresponding parts.

I employ a large metallic disk, A, for supporting the movable cutters B, which I arrange in dovetail grooves in one side thereof, in lines running from the periphery to a point slightly in advance of the axis, in the direction of the rotation of the said disk, whereby a shear-cut is effected with the fixed knife C, the edge of which is in a radial line, the cut commencing at the inner and working towards the outer end.

Below the fixed knife C, I arrange another fixed knife, D, parallel therewith, but considerably below the centre of the disk, whereby another shear-cut is also effected upon the part of the rags previously cut and carried down to the lower fixed knife by the rotating cutters between the disk and the beam E of the machine. This cut begins at the outer ends of the knives and works inward.

The fixed knives C and D are made adjustable to or from the rotating knives.

In order to bring the feed-rollers as near to the cutting-edges of the knives as possible for the better feeding of the rags, I make the stock of the knife C so as to curve around the front and under the lower feed-roller adjacent thereto, and extend behind it, for attachment to its support D', to permit ready access for adjusting it.

I propose to employ two sets of feed-rollers F, arranging the inner set to have greater speed than the outer, for drawing out the rags or other substance.

Having thus described my invention,

What I claim as new, and desire to secure by Letters Patent, is—

1. The combination of the disk A, knives B and C, when all arranged substantially as specified.

2. The combination of the disk A, knives B, C, and D, when all arranged substantially as specified.

3. The knife C, formed as described, and combined with the fixed rollers and the knives B, substantially as specified.

J. W. BARBOUR.

Witnesses:
NATHAN A. BAILEY,
DAN. H. SMITH.